Sept. 18, 1962 E. V. MONTROSS 3,054,932

TIME SEQUENCER

Filed Oct. 3, 1957 6 Sheets-Sheet 1

INVENTOR.
EUGENE V. MONTROSS

BY

Murray Nanes
ATTORNEY

Sept. 18, 1962 E. V. MONTROSS 3,054,932

TIME SEQUENCER

Filed Oct. 3, 1957 6 Sheets-Sheet 3

Sept. 18, 1962 E. V. MONTROSS 3,054,932

TIME SEQUENCER

Filed Oct. 3, 1957 6 Sheets-Sheet 4

United States Patent Office 3,054,932

Patented Sept. 18, 1962

3,054,932

TIME SEQUENCER

Eugene V. Montross, Poughkeepsie, N.Y., assignor to International Business Machines Corporation, New York, N.Y., a corporation of New York Filed Oct. 3, 1957, Ser. No. 687,986
8 Claims. (Cl. 317—25)

This invention relates to time sequence devices and more particularly to devices operative for sequentially energizing electrical circuits at predetermined intervals, and for deenergizing selected ones of said electrical circuits when trouble is indicated in a circuit.

In certain types of electrical apparatus (for instance, present day electronic computers), it is desirable to provide electrical supply voltages to the apparatus in a predetermined sequential order. At the same time, it may be desirable to remove the supply voltages in reverse sequential order.

Certain of the power supplies for particular voltages may require relatively long periods of time to be brought up to full value. It may be necessary that these voltages be at their full value before they are supplied to the apparatus. It is desirable that if a trouble occurs in a supply circuit that the supply voltages be removed in reverse order without removing the voltages which require long periods of time to be brought up to full power. Thus if a trouble can be quickly repaired, it is not then necessary to wait the long periods of time when starting up again. However, if there is trouble in a circuit which must be energized before the circuits requiring long periods of time for energization, it would then be necessary to remove all of the circuits.

It is therefore an object of this invention to provide a time sequencer using inexpensive components which automatically advances itself to energize electrical circuits in sequence.

Another object of the invention is to provide an improved time sequencer which is responsive to the detectio nof troubles in a circuit for deenergizing the electrical circuits in reverse sequential order.

Still another object of the invention is to provide a time sequencer which may selectively deenergize circuits when there is trouble in a circuit.

A further object of the invention is to provide an interconnected mechanical time sequencer which selectively resets either part of the way or all the way, depending upon the particular circuit having the trouble.

A still further object of the invention is to provide a time sequencer which may selectively deenergize power circuits and control circuits when there is trouble in the sequencer.

In accordance with the foregoing objects, the preferred embodiment of this invention provides two pluralities of electrical circuits with contact or switch means for the individual circuits of each plurality that can be closed to complete the circuits. A closing means comprising a shaft with cams thereon is incrementally rotated by a solenoid and clutch arrangement to sequentially close the contacts of the circuits of one plurality of circuits and then to sequentially close the contacts of the circuits in the remaining plurality. As the closing means reaches each increment of travel it is so held by one of two independent latches against a resilient means constantly urging the shaft and cams in a reverse direction of rotation to open the contacts in reverse sequence. Each latch is effective for one plurality of circuits and can be selectively released to free the shaft and cams.

As each circuit is completed, it is then sensed for electrical trouble by a detection means. The detection means is arranged in two detection circuits to indicate in which plurality of circuits an electrical trouble is located when such trouble occurs. By using each of the two detection circuits to render one of the latches inoperative, the contacts of either one or both pluralities of circuits are opened until the trouble is corrected. For example, if a circuit is defective in the second plurality, one latch is rendered inoperative so that all completed second plurality circuits are opened in reverse sequence leaving the first plurality circuits energized. Alternatively, if a circuit of the first plurality is defective, both latches are rendered inoperative so that all completed circuits of both pluralities are opened in reverse sequence.

In particular applications for the invention, the time period between completing two successive circuits is to be defined. Therefore, a timing means is provided to be actuated by one circuit of the first plurality to control the closing means as it completes the next circuit of that plurality.

The present invention has the advantage of permitting alternating and direct current circuits to be separately completed in sequence which is especially desirable in bringing rectified A.C. voltages up to full value before utilizing these voltages in D.C. circuits. By providing timing means in conjunction with sequential circuit closing, particular circuits can be successively completed at automatically varied intervals.

Other objects, features and advantages of the invention will be pointed out in the following description and claims and illustrated in the accompanying drawings, which disclose, by way of example, the principle of the invention and the best mode, which has been contemplated, of applying that principle.

Figure 1:
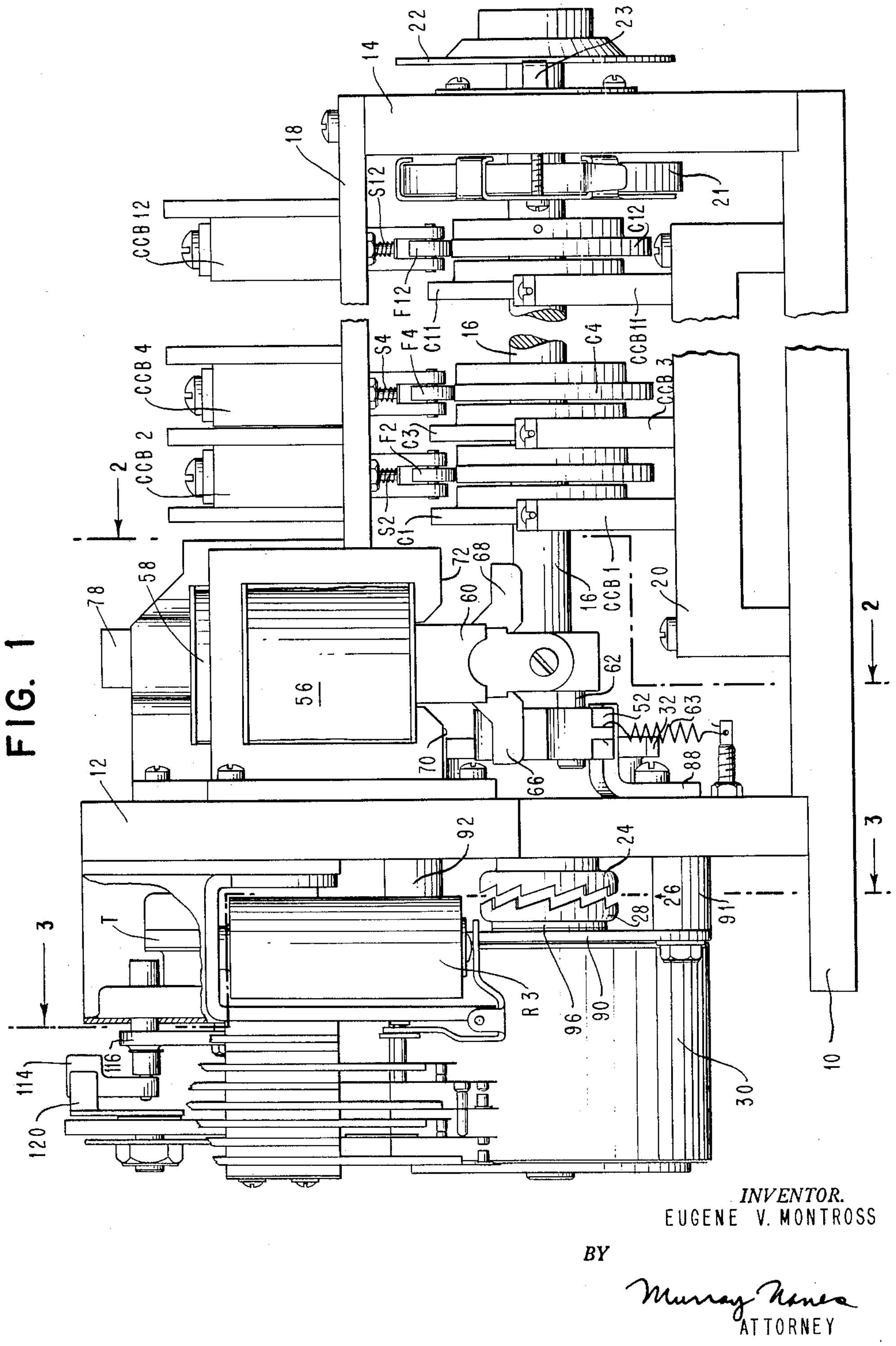
FIG. 1 is a side elevational view of the mechanical structure of the time sequencer.

The preferred embodiment shown in the drawings relates to a sequencing device which controls the application of power supply voltages to a utilization means (such as a calculator) in a predetermined sequence. In most electronic machines, it is necessary to turn on the A.C. voltages first, especially because the A.C. voltages are used for filament voltages in vacuum tubes in different parts of the machine. A fairly long period of time is allowed for the filament voltages and the D.C. supplies to be brought up to full voltage (in the preferred embodiment described herein, approximately four and a half minutes) after which time the D.C. voltages are sequentially supplied. It can be understood by those familiar with electronic art that it might be disastrous to supply positive D.C. voltages to the plates of vacuum tubes before supplying the negative D.C. voltages to the grids.

If there is trouble in any of the D.C. voltage lines, the sequencing device will be turned to the position which removes the D.C. voltages but keeps the A.C. voltages on, and the trouble in the D.C. lines may be fixed without the necessity of going back to the four and one half minute delay necessary to bring the D.C. voltages up to full power. However, if there is a power loss or other trouble in an A.C. line, the machine operates to sequentially turn off both the D.C. and A.C. voltages in reversed sequential order.

SEQUENCER—STRUCTURE

Figure 2:
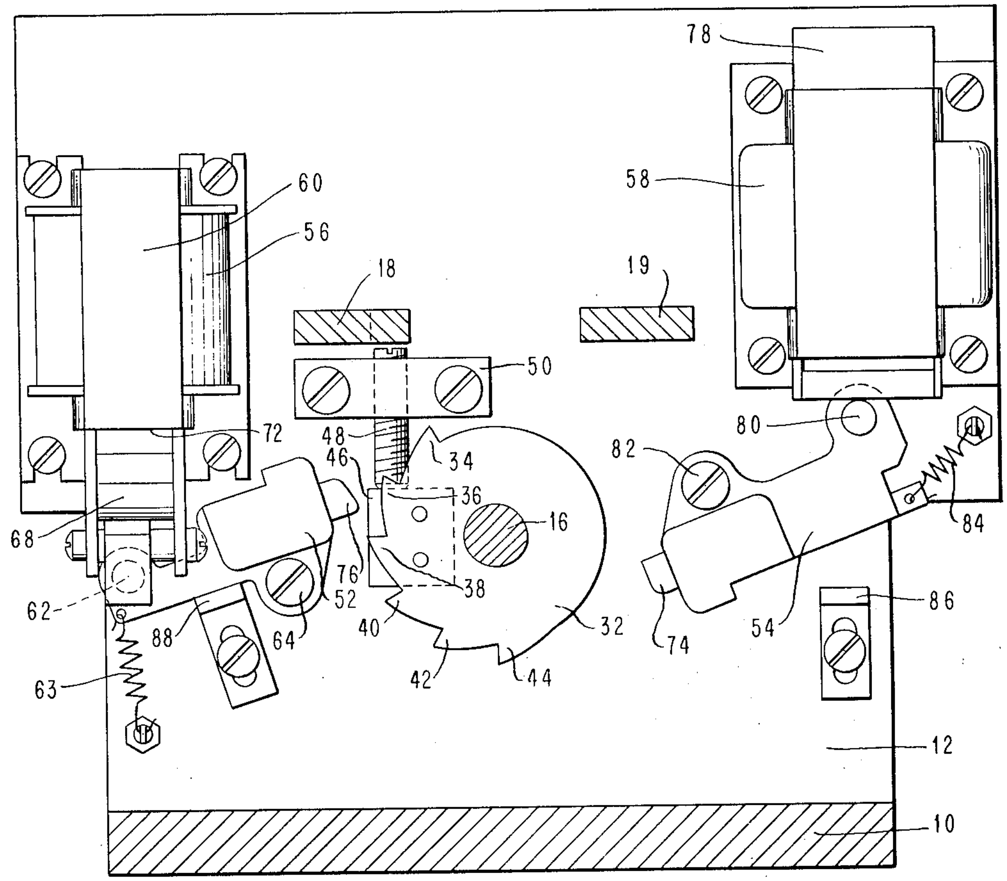
FIG. 2 is a section taken on the line 2—2 of FIG. 1 which shows the position of the ratchet and pawls when the A.C. and D.C. solenoids are deenergized.
Figure 3:
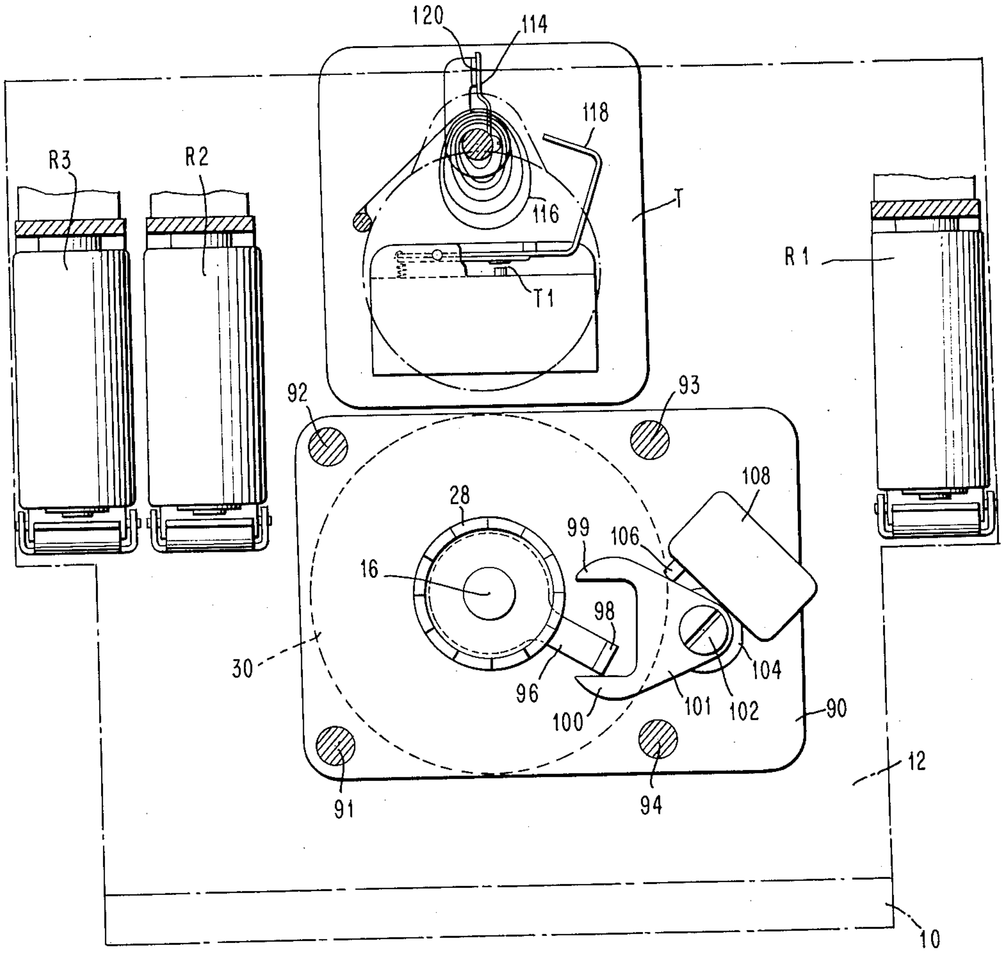
FIG. 3 is a section taken on the line 3—3 of FIG. 1.

Referring now to FIGS. 1, 2 and 3, a sequential timing device assembly is shown mounted on a base plate 10. A bearing support plate 12 is affixed to one end of the base plate 10, and a bearing support plate 14 (FIG. 1) is affixed to the other end of the base plate 10. A drive shaft 16 is journalled in ball bearings (not shown) counterbored on bearing support plates 12 and 14. The shaft 16 carries twelve cams C1 through C12 affixed thereto, but it can be understood that any number of cams may be fixed to the shaft 16. Cam followers F2, F4, F6, F8, F10 and F12 are urged against cams C2, C4, C6, C8, C10 and C12 respectively, by springs S2, S4, S6, S8, S10 and S12, respectively. High dwells on these cams will cause the cam followers F2, F4, F6, F8, F10 and F12 to move upward and effect the closing of contacts in cam circuit breakers CCB2, CCB4, CCB6, CCB8, CCB10 and CCB12 respectively which are mounted on a pair of support bars 18 and 19 which are in turn mounted to the top of bearing support plate 14 and the side of bearing support plate 12. It can be understood that when any of said cams present a low dwell to its corresponding cam follower F2 to F12, the corresponding spring S2 to S12 will effect the opening of the corresponding contacts of the cam circuit breakers CCB2 to CCB12. The cam circuit breakers CCB2, CCB4, CCB6, CCB8, CCB10 and CCB12 are power cam circuit breakers of rugged construction because they are made to make and break power supply leads. The cam circuit berakers CCB1, CCB3, CCB5, CCB7, CCB9 and CCB11 which are mounted on a platform 20 affixed to the base plate 10, are control cam circuit breakers and are smaller and less rugged. However, the latter control cam circuit breakers cooperate with cam C1, C3, C5, C7, C9 and C11, respectively and cam followers F1, F3, F5, F7, F9 and F11 respectively (not shown) in much the same manner as the power cam circuit breakers cooperate with their associated cams and cam followers.

Fastened to bearing plate 14 is the outside end of a wound spring 21 which has its inside end fastened to shaft 16. The spring 21 is thus adapted to urge shaft 16 in a clockwise manner (FIGS. 2 and 3). At the very end of shaft 16 is an indicator 22 which is graduated into 360°. A pointer 23 fixed to bearing support plate 14 points to 0° when the shaft 16 is in its original reset position, and also indicates the degrees the shaft 16 has rotated when operated. The other end of shaft 16 extends through the bearing support plate 12 where it is connected to clutch ratchet plate 24 of clutch member 26. Another ratchet plate 28 of the clutch member 26 is connected to a stepping solenoid 30. The stepping solenoid 30 is a standard commercial Ledex switch manufactured by G. H. Leland which operates so that upon each energization it causes the engagement of the clutch ratchet plates 24 and 28 and a rotation of slightly over 30°. Thus the shaft 16 is rotated slightly over 30° against the urging of spring 21.

When the stepping solenoid 30 has moved the shaft 16 30°, it is automatically deenergized in a manner to be hereinafter described and is caused to reset to its original position. If the shaft 16 was not held in place at the 30° position, it would also be returned to the original home position by the spring 21. However, a pair of ratchet and pawl arrangements are utilized to prevent the shaft 16 from returning after each 30° forward movement. The ratchet and pawls may best be seen in FIG. 2.

A ratchet 32 (FIGS. 1 and 2) is fixed to shaft 16 and has six saw teeth 34, 36, 38, 40, 42 and 44 (FIG. 2), which have their radial surfaces 30° from their adjacent teeth. The shaft 16 is shown in the 0° position in FIG. 2. To hold the shaft 16 in the 0° position against the urging of spring 21, a rectangular stop member 46 which is fastened to ratchet 32 bears against an adjusting screw 48 which is threaded in rectangular member 50 which in turn is fixed to the bearing support plate 12. The A.C. and D.C. pawls 52 and 54 which cooperate with the teeth of ratchet 32 are movable into their latching position by an A.C. solenoid 56 and a D.C. solenoid 58 respectively. In the A.C. solenoid 56, the armature 60 is mechanically linked to the main body of pawl 52 by a pin 62. The energization of the A.C. solenoid 56 will cause the armature 60 to move upward and cause a clockwise rotation into latching position, against the urging of a spring 63, of pawl 52 about a pivot 64 mounted in bearing support plate 12.

Figure 2A:
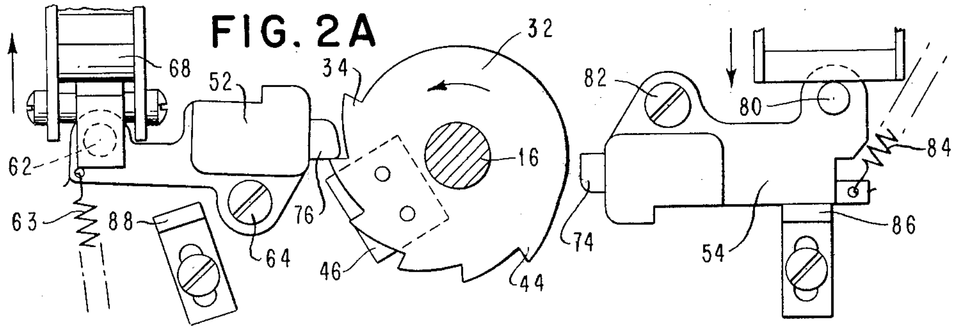
FIG. 2A is a portion of FIG. 2 showing the position of the ratchet and pawls when the A.C. and D.C. solenoids are energized.

FIG. 2A shows the position taken by the pawl 52 upon energization of A.C. solenoid 56. The pawl 52 is prevented from further clockwise rotation because a pair of keepers 66 and 68 on the armature 60 are stopped from further upward movement by the surfaces 70 and 72 respectively, of A.C. solenoid 56. The first 30° movement in the counterclockwise direction by the stepping solenoid 30 rotates the shaft 16 and the ratchet 32 to the position shown in FIG. 2A. It is possible for the ratchet 32 to rotate its teeth in spite of the position taken by the pawl 52 in FIG. 2A because a pawl plunger 76 is slidably mounted in pawl 52 and spring loaded so as to ride over the contour of the ratchet teeth when the ratchet 32 is rotated counterclockwise. Since the ratchet 32 is actually rotated slightly more than 30° by the stepping solenoid 30, the spring loaded plunger 76 comes out to cooperate with the ratchet tooth 36 to latch the ratchet 32 in the 30° position when the stepping solenoid 30 is deenergized and the ratchet 32 moves back under urging of shaft spring 21. The second 30° movement by the stepping solenoid 30 will bring the ratchet 32 to the 60° position where the ratchet tooth 34 cooperates with the pawl plunger 76.

The next four 30° positions are for D.C. energization and the ratchet 32 is held in position by the pawl 54 and its plunger 74. Pawl 54 cooperates with the D.C. solenoid 58 which is a push type solenoid; the armature 78 of which, upon energization, moves down against a pin 80 which is fixed to pawl 54 to cause a clockwise rotation about pivot 82 of pawl 54 against the urging of a spring 64 to bring the pawl plunger 74 into latching position against a stop 86 mounted on bearing support plate 12.

At the 90° position, after the stepping solenoid 30 has been energized three times, the ratchet tooth 44 will cooperate with pawl plunger 74. In a similar manner the latch teeth 42, 40 and 38 will cooperate with the pawl plunger 74 at the 120°, 150° and 180° position respectively of the ratchet 32. It will be presently shown that the stepping solenoid 30 stops stepping at 180°.

When the D.C. solenoid 58 is deenergized, the spring 84 (FIG. 2) fixed to the bearing support plate 12 rocks the pawl 54 counterclockwise and pin 80 bearing against armature 78, lifts it. Since the pawl 54 no longer latches the ratchet 32, the ratchet 32 returns under the urging of spring 21 to its 60° position where the ratchet tooth 34 cooperates with pawl plunger 76. Thus deenergization of the D.C. solenoid effects the return of the cam shaft 16 and the cams C1 through C12 to the 60° position. Now, if the A.C. solenoid 56 is deenergized, the pawl 52 will be rocked counterclockwise by the action of the spring 63, which is fixed to bearing support plate 12, until the pawl 52 comes in contact with a stop 88. The rotation of the pawl 52 effects a lowering of the armature 60. The ratchet 32, now unlatched, returns under the urging of spring 21 to the home position where stop 46 contacts adjusting screw 48.

It is obvious that if the D.C. solenoid 56 and the A.C. solenoid 58 were simultaneously deenergized, the ratchet 32 and cams C1 to C12 would be returned by the spring 21 from the fully energized 180° position to the home position.

It is unnecessary to go into the details of operation of the commercially available rotary solenoid 30 to understand the invention, except to say that when the solenoid 30 (which is mounted on a plate 90 that in turn is fixed by four studs 91, 92, 93 and 94 to the bearing support plate 12) is energized, a magnetic pull moves its armature along the solenoid axis (to the right in FIG. 1) to cause the clutch 26 to engage. This linear action is effectively converted into a rotary motion of 35° by means of internal ball bearings on internal inclined races (not shown). In turning 35°, an arm 96 (FIG. 3) which is fastened to clutch plate 28 also turns 35°. A finger 98 on the arm 96 is adapted to cooperate with two prongs 99 and 100 of a lever 101. The two pronged lever 101 is pivotally mounted on a pin 102 fixed in plate 90. The lever 101 is prevented from freely moving by a locking washer spring 104 between plate 90 and the lever 101.

When the stepping solenoid 30 is energized and starts rotating the arm 96, the lever 101 will remain in the position shown in FIG. 3 due to the pressure of the locking washer spring 104 until finger 98 contacts prong 99 at 28°. Finger 98 then causes a clockwise movement of lever 101, which in turn presses against an actuating button 106 of a solenoid reset unit 108. This effects the opening of contacts 110 within the solenoid reset 108 in a manner to be hereinafter described and causes the deenergization of the stepping solenoid 30 which returns the solenoid 30 by an internal spring (not shown) to its zero position.

When the arm 96 returns toward the zero position, the lever 101 remains in position, because of the locking washer spring 104, to keep the contacts 110 open until finger 98 contacts the prong 100, rocking lever 101 clockwise and allowing solenoid reset contacts 110 (FIG. 4) of unit 108 to close. It is understood that the shaft 16 and cams C1 to C12 will only move back to the 30° position, being held in that position by the ratchet and pawl arrangement described hereinbefore. It is the opening of the solenoid reset contacts 110 on the return by the stepping solenoid 30 which reenergized the solenoid to restart the stepping of the solenoid 30. As will be presently described, however, this closing of the solenoid reset contacts 110 after each stepping of the solenoid 30 only takes place after the stepping solenoid 30 has stepped the shaft 16 to the 60° position. That is, the automatic stepping takes place from a 60° position until the 180° position is reached. At the 30° position of the shaft, certain cam circuit breakers will close, as will be described hereinafter for energizing the A.C. voltage supplies. Therefore, at the 30° position of the shaft, a four and a half minute delay is necessary, in order to allow time for the filament and the D.C. voltages to build up. The four and a half minutes time is obtained from a timer T. The timer T is a commercially available type adjustable timer manufactured by the Haydon Mfg. Co. which is energized when the shaft 16 reaches the 30° position. The timer T when energized, begins to rotate an arm 114 clockwise (FIG. 3) against the urging of a spring 116. Arm 114 continues to rotate, as long as it is energized, until it enters into engagement with a bent member 118 after four and a half minutes. The bent member 118 is moved downward until it closes a pair of timer contacts T–1. The closing of the timer contacts T–1 effects the reenergizing of the stepping solenoid 30 to cause it to step 30° and move the shaft 16 and cams C1 to C12 from 30° to 60°. When the cams reach the 60° point, the circuit energizing timer 112 will also be deenergized, and the arm 114 will restore itself under the urging of spring 116, opening the timer contacts T–1 and resting against stop 120. There is no other long delay, and now the shaft 16 is automatically stepped as mentioned hereinbefore.

POWER SUPPLY CIRCUITS

Before describing the time sequencing circuitry, a description will be given of a representative power supply (FIG. 4) for providing A.C. and D.C. voltages to a utilization means for which the preferred embodiment of the invention is designed.

An assumption will first be made that the circuit is in proper working order. 208 volt A.C. three phase lines 122 are connected to a three phase switch 124. The closing of the three phase switch 124 brings 208 volts A.C. to lines 126, 128 and 130. An A.C. power sensing relay R9 is connected between lines 126 and 128, while an A.C. power sensing relay R10 is connected between lines 128 and 130. If upon the closing of the three phase switch 124, there is no A.C. voltage present on any one of the lines 126, 128 and 130, either relay R9 or R10 will not be energized and the sequencer mechanism will not be operated for reasons to be described hereinafter. Thus the absence of A.C. voltages is detected by A.C. sensing relays R9 and R10.

Figure 7:
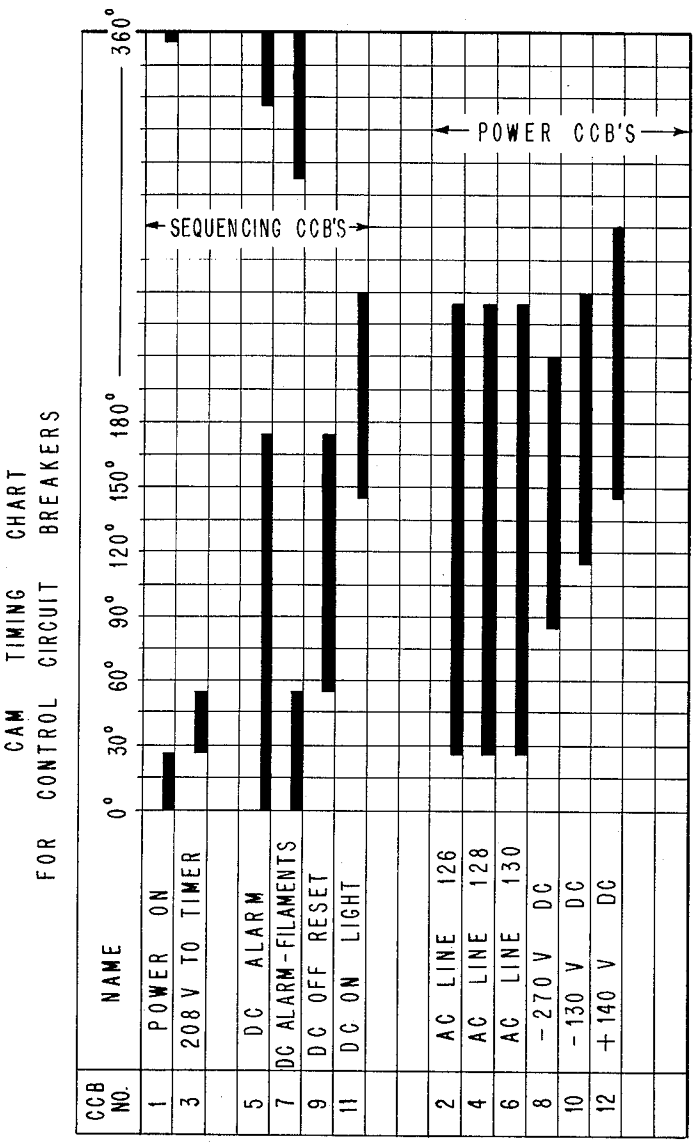
FIG. 7 is a timing chart indicating the times of making and breaking of the cam circuit breakers used in the time sequencer for supplying the voltages in the power supply of FIG. 4.

At this point, a study of FIG. 7 is helpful. FIG. 7 is a timing chart indicating the time of making and the time of breaking of each of the CCB contacts 1 through 12. An inspection of the power CCB's at the bottom of the chart, shows that the A.C. lines 126, 128 and 130 becomes available when CCB2, CCB4 and CCB6 make at approximately 25° and stay made past 180°. This indicates that during the first 30° movement of the shaft 16, the cams CCB2, CCB4 and CCB6 close at 25° and are therefore closed at 30°.

Returning to FIG. 4, when cam circuit breaker contacts CCB2, CCB4 and CCB6 close at 25° connections are made to lines 132, 134 and 136, respectively.

Figure 4:
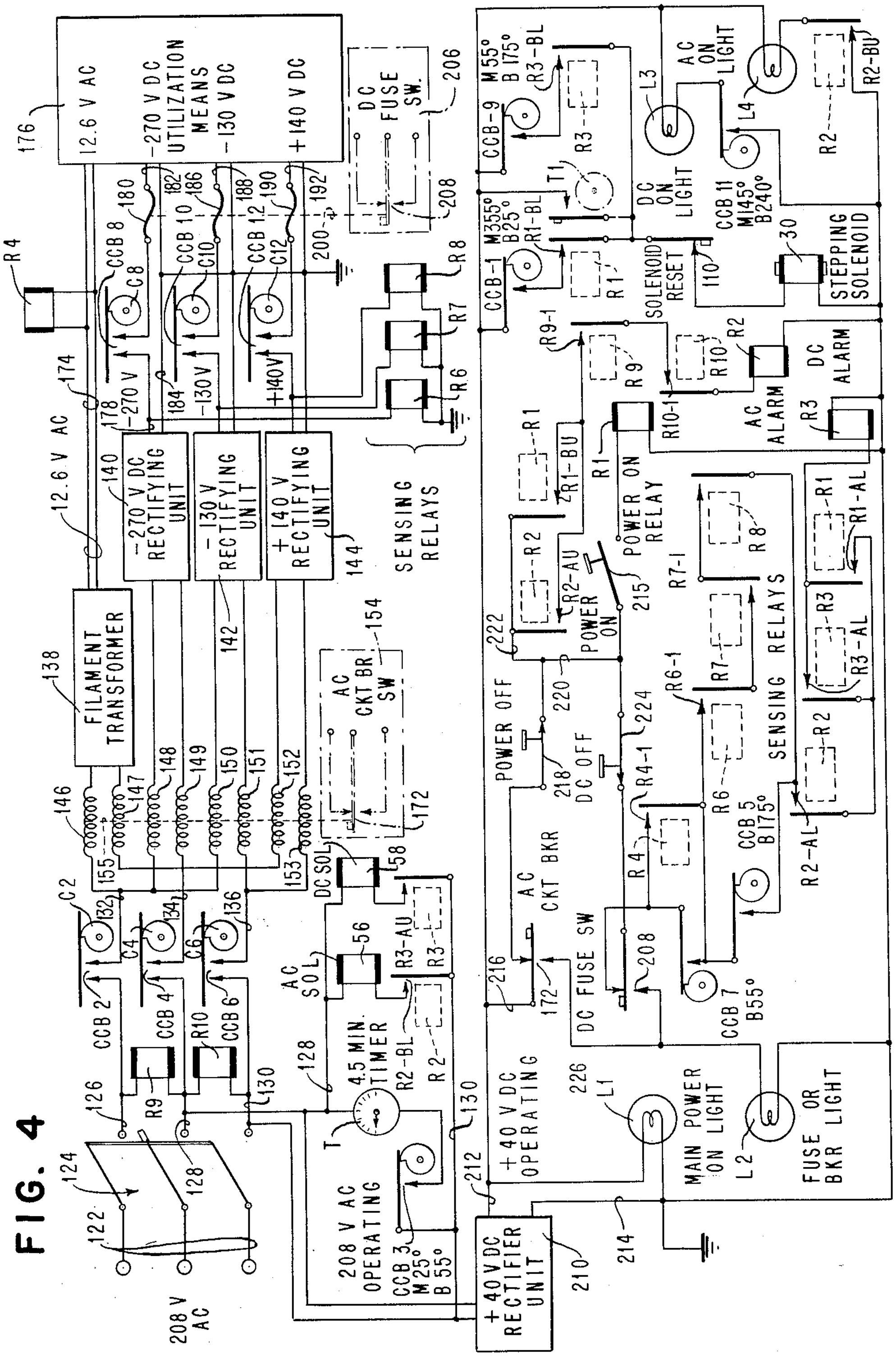
FIG. 4 is a circuit diagram of a typical power supply and a preferred embodiment of the time sequencer to be used therewith.
Figures 5, 6:
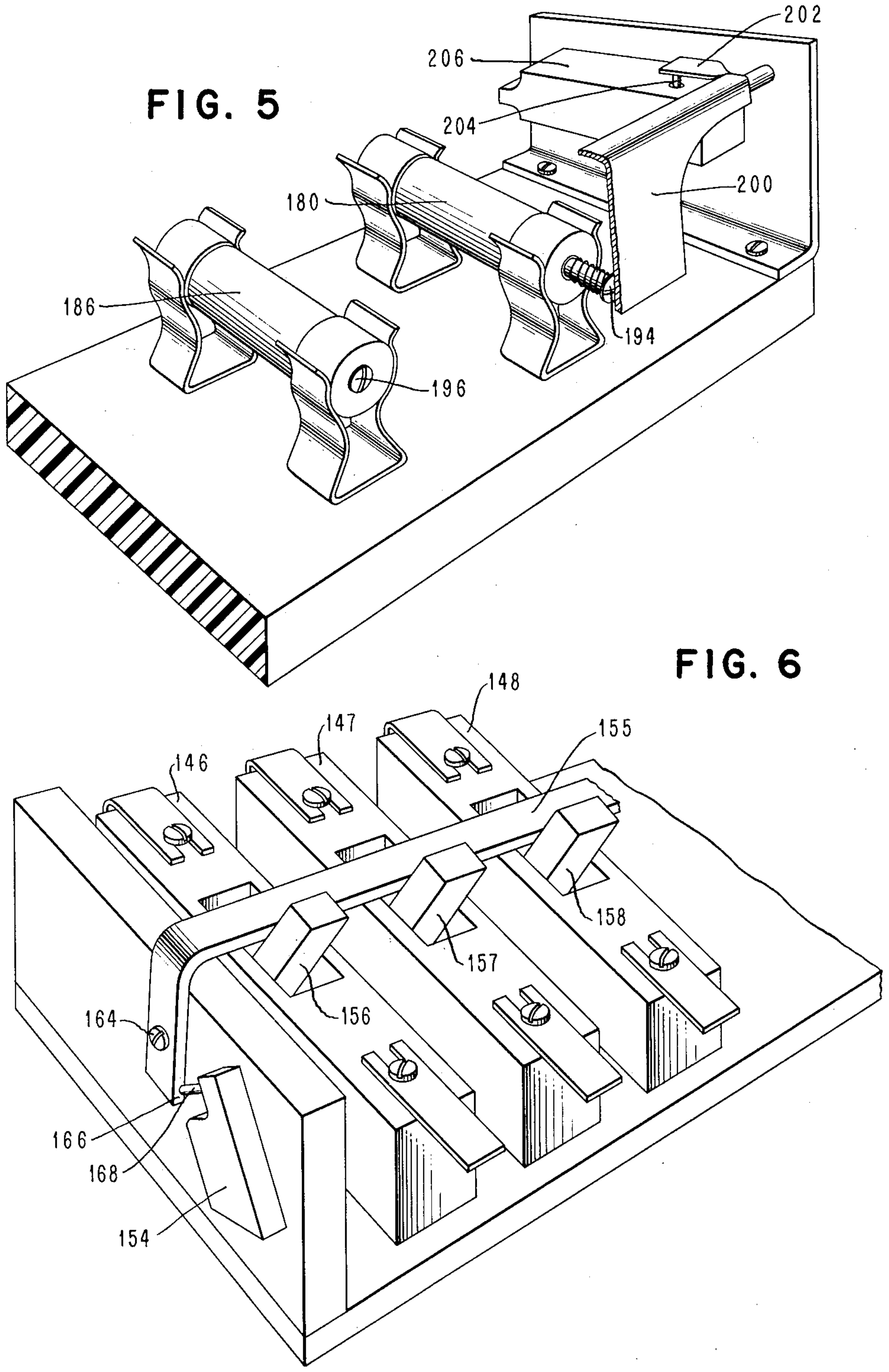
FIG. 5 is a perspective view of a particular fuse device used in the power supply of FIG. 4.
FIG. 6 is a perspective view of a particular circuit breaker device used in the power supply of FIG. 4.

Closing of the cam circuit breaker contacts will provide power to a filament transformer 138 and rectifying units 140, 142 and 144. Since the A.C. lines 132, 134 and 136 are three phase, and the rectifying units 140, 142 and 144 and transformer 138 are single phase, only two A.C. lines are tapped for each one of the transformer and rectifying units. Thus, the filament transformer 138 is connected from lines 132 and 134 through circuit breakers 146 and 147 respectively. In the same manner, the −270 volts D.C. rectifying unit 140 is connected to A.C. lines 132 and 134 via circuit breakers 148 and 149. The −130 volt D.C. rectifying unit 142 is connected to A.C. lines 132 and 136 via circuit breakers 150 and 151 to the +140 volt D.C. rectifying unit 144 which is connected to lines 134 and 136 via circuit breakers 152 and 153. While relays R9 and R10 indicate an absence of A.C. voltages, circuit breakers 146 through 153 are in the circuit to indicate an overload. An overload in any one of the A.C. lines will operate its respective circuit breaker in a well known manner and actuate an A.C. circuit breaker switch 154 shown schematically in FIG. 4. FIG. 6 indicates that a movable bail 155 is in contact with the toggles 156 through 163 (only partly shown) of all of A.C. circuit breakers 145 through 153 respectively. The deenergization of any one of the circuit breakers 146 through 153 will cause its associated toggle to go to the Off position (upward in FIG. 6). The movement of the bail 155 about its pivot 164 causes the bail end 166 to press on a button 168 of the unit 154 transferring its contacts 172 (FIG. 4) to light a light and open the circuit in a manner to be presently described. It is thus apparent that A.C. trouble may exist by either an absence of A.C. voltage or an overload.

The output of the filament transformer 138 which operates in a well known step down manner is 12.6 volts A.C. which is fed via lines 174 to a utilization means 176 and to an A.C. filament voltage presence relay R4.

The loss of the 12.6 volts A.C. filament voltage on lines 174 will cause the deenergization of the relay R4 which acts in the circuit in a manner to be hereinafter described to remove the D.C. voltages from the utilization means 176 and reset the shaft 16. The output of rectifying unit 140 which operates in a well known manner to convert A.C. voltages to D.C. voltages, is a −270 volt D.C. lead line 178 which is connected via CCB8 contacts and a fuse 180 to the −270 volt D.C. lead 182 at the utilization means. The other output of the −270 volt D.C. rectifying unit 140 is a ground lead 184. In a similar manner the −130 volt rectifying unit 142 has an output of −130 volts which is connected via the cam circuit breaker contacts CCB10 and a fuse 186 to the −130 volt D.C. line 188 at the utilization means 176, and the +140 volt rectifying unit 144 has an output of +140 volt which is connected via the cam circuit breaker contacts CCB12 and a fuse 190 to the +140 volt D.C. line 192 at the utilization means 176.

Each of the fuses 180, 186 and 190 (partly shown in FIG. 5) are of the commercially available type wherein an overload through any of the fuses 180, 186 or 190 causes a detent 194, 196 or 198 (not shown) respectively, to operate a bail lever 200. FIG. 5 illustrates an overload in fuse 180, the detent 194 of which would then be pushed out under the urging of an internal spring (not shown). This causes the bail lever 200 to rock in a direction so that an ear 202 on the lever 200 moves downward depressing a button 204 on a D.C. fuse switch unit 206. The D.C. fuse switch unit 206 transfers D.C. fuse contacts 208 (FIGS. 5 and 4).

To indicate a loss of a D.C. voltage, the D.C. sensing relays R6, R7 and R8 (FIG. 4) are utilized. The −270 volt lead 178 is connected through the relay R6 to ground, and the −130 volt lead is connected through the relay 7 to ground, while the +140 volt lead is connected through the relay R8 to ground. The loss of any one of these voltages will cause its respective sensing relay to be deenergized which will cause the sequencer to be restored to the 60° position removing all the D.C. voltages, as will be hereinafter described.

Circuitry has thus been described for indicating troubles in the power supply, that is, loss of A.C. and D.C. voltages or overloads in the A.C. or D.C. voltage line, and now a description will be given of the sequencing circuitry.

SEQUENCING CIRCUITS

The 208 volt A.C. lines 126, 128 and 130 are "hot" electrically when the three phase switch 124 is closed even before the cam circuit breakers CCB2, CCB4 and CCB8 are operated. Thus, lines 126, 128 and 130 may be used as a constant source of voltage, the presence of which is detected by power sensing relays R9 and R10. The 208 volts A.C. leads 128 and 130 are brought to a +40 volt D.C. rectifier 210 to provide constant source +40 volt D.C. operating voltage at a lead 212 and to provide ground at a lead 214. The presence of the +40 volt D.C. which is used by the sequencing circuits for control, is indicated by the lighting of a main power on light L–1 which is across the output of the +40 volt D.C. rectifier 210 between leads 212 and 214.

At the start of the operation, a power On button 215 (FIG. 4) is manually closed to energize a power On relay R1. This is accomplished by a circuit from the +40 volt line 212 through a lead 216, the normally closed contacts of A.C. circuit breaker contacts 172, a normally closed power Off button 218, a lead 220, the now closed power On button 215, and the power On relay R1 to ground lead 214. The closing of the power On contacts 215 energizes the power On relay R1 to initiate the energization of relays R2 and R3 and the first stepping of the stepping solenoid 30 in a manner to be now described. With the energization of power On relay R1, its contacts R1–BU are closed for energizing the A.C. alarm relay R2 by completing a circuit from the +40 volt lead 212, the lead 216, the normally closed A.C. circuit breaker contacts 172, the normally closed power Off switch 218, a lead 222, the now closed R1–BU contacts, the closed A.C. power sensing relay contacts R9–1 and R10–1 and the A.C. alarm relay R2 to ground lead 214. The energization of relay R2 causes the contacts R2–BU to close to complete a circuit for energizing an A.C. On light L–4 by a circuit from the +40 volt D.C. lead 212 via the A.C. On light L–4 and the now closed R2–BU contacts, to ground lead 214. The energization of relay R2 also causes its contacts R2–BL to close completing a circuit to energize the A.C. solenoid 56 (to rock the A.C. pawl 52 into latching position) by a circuit from A.C. line 128 through the A.C. solenoid 56 and the now closed contacts R2–BL to A.C. line 132.

The energizing of power On relay R1 also causes its R1–BL contacts to close energizing the stepping solenoid 30 thirty degrees. This is accomplished by a circuit which is completed from the +40 volt line 212 through the CCB1 contacts which are closed in the 0° start position (see FIG. 7) the now closed R1–BL contacts, the normally closed solenoid reset contacts 110 and the stepping solenoid 30 to ground. The energization of the stepping solenoid causes a 35° rotation of the cam shaft 16 and the cams C1 through C12 as previously described. When the cam shaft 16 has rotated 27° the solenoid reset contacts 110 open, in a manner previously described, to break the circuit to the stepping solenoid 30. The inertia of the device carries it to 35° before returning it to the home position. However, since the A.C. solenoid 56 is now energized by the closing of relay contacts R2–BL, the pawl 52 latches the shaft 16 and cams C1 through C12 in the 30° position. Moving the cam shaft 16 into the 30° position produces a closing of the cam circuit breaker contacts CCB2, CCB4, and CCB6 (at 25° as shown in FIG. 7) which brings A.C. voltage to the filament transformer 138 and the rectifying units 140, 142 and 144 begin bringing these voltages up to full power. From FIG. 7 it can also be observed that the cam circuit breaker CCB3 closes at 25° for energizing the four and a half minute timer T by a circuit from A.C. lead 128 via timer T and the now closed CCB3 contacts to A.C. lead 130. The four and a half minute timer T operates, as previously described, to rotate its arm 114 to the point where timer contact T–1 shown in FIG. 3 are closed to energize the stepping solenoid 30 for the next 30° movement to the 60° position. This is accomplished by circuit from the +40 volt line 212 via the now closed timer contacts T–1, the normally closed solenoid reset contacts 110, and the stepping solenoid 30 to ground lead 214. As can be seen in FIG. 7, the CCB3 contacts in the timer circuit open at 55° so at 60°, the four and a half minute timer T has been deenergized by the opening of the last mentioned circuits which causes the timer switch T–1 to reopen under the urging of spring 116.

Before describing how the stepping solenoid 30 is automatically repeatedly operated after 60°, a description will be given of the energization of the D.C. solenoid 58 for rocking the D.C. pawl 54 into latching position.

When all of the A.C. alarm relays are energized, its contacts R2–AL close and a circuit is completed for energizing D.C. alarm relay R3 from the +40 volt D.C. lead 212 through the normally closed A.C. circuit breaker contacts 172, through the closed power Off switch 218, the lead 220, normally closed D.C. Off contacts 224, the normally closed contacts of the D.C. fuse switch, through the closed contacts of the CCB7 circuit breakers, and the CCB5 contacts, the now closed A.C. alarm relay R2–AL contacts, and the now closed power On relay R1–AL contacts, through the D.C. alarm relay R3 to ground lead 214.

The energization of D.C. alarm relay R3 causes its contacts R3–AU to close to energize the D.C. solenoid 58 by completing a circuit from A.C. line 128 through the D.C. solenoid 58, the now closed R3–AU contacts to A.C. line 130. The energization of D.C. solenoid 58 rocks the D.C. pawl 54 clockwise to the latched position as hereinbefore described.

When the sequencer is in the 30° position, the A.C. cam circuit breaker contacts CCB2, CCB4 and CCB6 are closed applying A.C. voltage to the filament transformer 138 and the rectifying units 140, 142 and 144. During the four and one half minutes that the sequencer is in the 30° position, the A.C. filament voltages and the D.C. voltages will gradually come up to full power and energize the filament relay R4, and the sensing relays R6, R7 and R8 respectively, preparatory to being applied to the utilization means 176.

A test is made at the 30° position of the cam shaft 16 to determine if filament voltage is present. If there is no filament voltage present, the D.C. alarm relay R3 will be deenergized which will allow the stepping solenoid 30 to move to the 60° point but will prevent any further advance of the cam shaft 16 into the area (90° to 180°) which provides D.C. voltages.

Even though the filament voltage is an A.C. voltage, it is not desirable to reset the cam shaft 16 completely when there is a loss in filament voltage because it is easier to find the trouble in the filament circuit if the A.C. voltages are not removed. This is true because if the cam shaft 16 is not moved passed the 60° point, it is better to have the filament voltage lit because this will not do any damage and if any of the filaments are observed as not being lit, it is an indication of a bad filament and the tube, which has the bad filament may be replaced without the necessity of waiting the four and one half minutes to again bring the cam shaft 16 up to the 60° position.

The presence of the filament voltage may be determined by whether relay R4 is energized. It can be observed that a cam circuit breaker CCB7 is shunted across filament voltage sensing relay R4 and that cam circuit breaker CCB7 opens at 55°. If the filament voltage sensing relay R4 is not closed at this time, the circuit previously described for energizing D.C. alarm relay R3 will then be opened, deenergizing the relay. The contacts R3–AU are thus open, deenergizing the D.C. solenoid 58 unlatching the pawl 52. The advancing circuit which will presently be described for energizing the stepping solenoid 58 after the 60° position is also deenergized.

The testing for the presence of D.C. voltages will be hereinafter described, but first the circuit for producing the automatic advance of the cam shaft 16 from 60° to 180° will be described. When the cam shaft 16 has rotated to the 60° position, a cam circuit breaker CCB9 will close after 55°. This will energize the stepping solenoid 30 by completing a circuit from the +40 volt line 212, through the now closed CCB9 contacts, the now closed D.C. alarm relay R3–BL contacts, the closed solenoid reset switch 110, and the stepping solenoid 30 to ground lead 214. The stepping solenoid 30 will then rotate the shaft to the 90° position after which time an automatic stepping of the solenoid 30 in 30° steps from the 90° position to the 180° position takes place. This is true because each time the stepping solenoid 30 reaches its 27° position, the solenoid reset contacts 110 open as previously described to deenergize the solenoid 30. However, the inertia of the stepping solenoid 30 is enough to carry it past the 30° point so that the cam shaft 16 may be latched into proper position. The stepping solenoid 30 then returns to its zero position allowing the solenoid reset contacts 110 to close at 7°. This in turn starts the stepping to the next position. This stepping will continue until the 180° position where the circuit remains open because cam circuit breaker CCB9 contacts break at 175°.

From FIG. 7, it can be seen that the −270 volt D.C. comes on just before 90° due to the closing of cam circuit breaker contacts CCB8, the −130 volt D.C. comes on just before 120° by the closing of the CCB10 contacts, and the +140 volt D.C. comes on just before 150° by the closing of the CCB12 contact. At 150° the machine is ready to make the test to determine if all of the D.C. voltages have been picked. This is accomplished by the opening of the cam circuit breaker CCB5 contacts at 175°. The CCB5 contacts shunt the sensing relay contacts R5–1, R7–1, and R8–1. When CCB5 opens at 175°, if any of the sensing relays R6, R7, or R8 is open, the circuit for energizing the D.C. alarm relay R3 will be opened deenergizing D.C. solenoid 58 to unlatch the pawl 52 and allow the spring 21 to return the cam shaft 16 to the 60° position where only A.C. voltages are present. It is apparent now that at 60° once the trouble is located and fixed, it is only necessary to press the power On button 215 to pick relay R1 which in turn picks D.C. alarm relay R3 and causes a rapid automatic stepping of the solenoid 30 to the 180° position without the four and a half minute delay.

When the cam shaft has reached the 145°, all of the D.C. voltages should be supplied to the utilization means, and an indication of this is obtained from the lighting of a D.C. On light L–3 which is energized by the closing of the cam circuit breaker contacts CCB11 at 145° to complete a circuit from +40 volt D.C. lead 212 via D.C. On light L–3 and cam circuit breaker contacts CCB11 to ground lead 214.

TROUBLE IN POWER SUPPLY AFTER FULL OPERATION

A description will now be given of the circuits within the sequencing circuit which are effective for each type of trouble which may occur in the power supply after the cams C1 to C12 are in the 180° position.

If any of the D.C. fuses 180, 186 and 190 blow because of an overload, the contacts of the D.C. fuse switch 208 will transfer and a circuit will be completed to energize a fuse or breaker light L–2 from the +40 volt D.C. lead 212, through the lead 216, the normally closed A.C. circuit breakers contacts 172, the closed power Off switch 218, the lead 220, the closed D.C. Off switch 224, the normally open contacts of the D.C. fuse switch 208 and the fuse or breaker light L–2 to ground lead 214. In addition to the visual indication, the D.C. alarm relay R3 is deenergized by the opening of the normally closed contacts of the D.C. fuse switch 208 which is in the circuit previously described for energizing the D.C. alarm relay R3. The deenergization of the D.C. alarm relay R3 causes the cam shaft 16 to restore to the 60° position. Thus, the fact that the cam shaft 16 is in the 60° position, that the A.C. On light L–4 is lit and the D.C. On light L–3 is not lit, and that the fuse or breaker light L–2 is lit is an indication that one of the D.C. fuses 180, 186 or 190 is open.

If the filament voltage sensing relay R4 becomes deenergized, its contacts R4–1 open to open the circuit which energizes the D.C. alarm relay R3. The cam shaft 16 will return to the 60° position. Thus the fact that the cam shaft 16 is in the 60° position, that the A.C. On light L–4 is lit and the D.C. On light L–3 is not lit, and one of the filaments in a vacuum tube is not lit, will pinpoint the trouble.

If there is a failure of power in any of the D.C. output voltages, one of the D.C. sensing relays R6, R7 or R8 will be deenergized. This will effect an opening of one of the respective contacts R6–1, R7–1 or R8–1 which will deenergize the D.C. alarm relay and return the cam shaft 16 to the 60° position. Thus the fact that the cam shaft 16 is in the 60° position, that the A.C. On light L–4 is lit and the D.C. On light L–3 is not lit, and that all the filaments are lit is an indication that there is trouble (probably failure of voltage) in one of the D.C. lines or the D.C. rectifying units 140, 142 or 144.

If there is an overload in any of the circuit breakers 146 through 153, the contacts 172 of the A.C. circuit breaker switch will transfer and the circuit will be completed to energize the fuse or breaker light L–2 from the +40 volt D.C. lead 212 through the lead 216, the now closed normally opened A.C. circuit breaker contacts 172, and the lead 226 to the fuse or breaker light L–2 to ground lead 214. In addition to the visual indication, the D.C. alarm relay R3 is deenergized by the opening of the normally closed contacts of the A.C. circuit breaker contacts 172 which is in the circuit previously described for energizing the D.C. alarm relay R3. It can also be recalled that the A.C. alarm relay contact R2–AL are in series with the D.C. alarm relay R3. Thus both the A.C. alarm relay R2 and the D.C. alarm relay R3 are deenergized when the A.C. circuit breakers 146 through 153 are overloaded and the cam shaft 16 is restored to the home position. Thus the fact that the cam shaft 16 is in the home position, that both the A.C. On light L–4 and the D.C. On light L–3 are not lit and that the fuse or breaker light L–2 is lit is an indication of an A.C. overload.

It can be observed from FIG. 4 that a loss of A.C. voltage will cause the deenergization of either R9 or R10, the contacts R9–1 and R10–1 of which are in the A.C. alarm relay R2 circuit. Thus the same sequence of events occurs for restoring the cam shaft 16 to the home position. In this case, however, the fuse or breaker light L–2 is not lit and the cam shaft 16 is in the home position and A.C. On light L–4 and D.C. On light L–3 are not lit. This combination indicates the absence of A.C. power.

A description has now been given of the operation of the sequencing device for a particular power supply embodiment illustrating the types of trouble which may exist and the manner in which the sequencing circuit indicates these troubles and allows for repair in the fastest possible manner with a minimum of "machine down" time.

While there has been shown and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intension, therefore, to be limited only as indicated by the scope of the following claims.

What is claimed is:

1. In a circuit controller, the combination of a first plurality of electrical circuits, a second plurality of electrical circuits, a plurality of contact means operable to close within the circuits of each said plurality of circuits, means to close said contact means of said first plurality of circuits in sequence and then to close said contact means of said second plurality of circuits in sequence, opening means actuatable for opening said contact means in reverse sequence, means for detecting electrical trouble in any of said circuits of either said plurality of circuits, and means responsive to the detection of electrical trouble in said second plurality of circuits by said detection means for actuating said opening means until said contact means of said second plurality of circuits are open, and responsive to the detection of electrical trouble in said first plurality of circuits by said detection means for actuating said opening means until said contact means of said first and second plurality of circuits are open.

2. In a circuit controller, the combination of a first plurality of electrical circuits, a second plurality of electrical circuits, a plurality of contacts operable to close within the electrical circuits of each said plurality of circuits, means to close said contacts sequentially within the circuits of said first plurality and then within the circuits of said second plurality, means for opening said contacts in reverse sequence, means for detecting electrical trouble in the circuits of said first and second plurality of circuits, including means for locating the plurality of circuits in which said electrical trouble occurs, and means responsive to said detecting means and said locating means for selectively controlling said opening means when said electrical trouble occurs to open one or both of said pluralities of circuits dependent upon the location of said electrical trouble.

3. In a circuit controller, the combination of a first plurality of electrical circuits, a second plurality of electrical circuits, a plurality of switch means operable to close within the circuits of each said plurality of circuits, operating means for closing said switch means successively in sequence for the circuits of said first plurality and then for the circuits of said second plurality, means for detecting electrical trouble in any circuits of said second plurality, including means for detecting current overloads therein, and means responsive to the detection of electrical trouble in said second plurality of circuits by said detection means for blocking further operation of said operating means and for selectively maintaining said switch means of said first plurality of circuits closed.

4. In a circuit controller, the combination of, a first plurality of circuits, a second plurality of circuits, a plurality of contact means operable to close within each said plurality of electrical circuits, mechanical means movable from a home position to first and second latching positions for sequentially operating said plurality of contact means to close within said first and second pluralities of circuits, return means adapted to urge said mechanical means toward said home position for opening said contact means in reverse sequence, first latching means for holding said mechanical means in said first latching position against the urging of said return means to maintain said contact means closed within said first plurality of circuits, second latching means for holding said mechanical means in said second position against the urging of said return means to maintain said contact means closed within said first and second pluralities of circuits, and means for detecting trouble in any of said first and second pluralities of circuits for selectively rendering said second latching means inoperative when trouble occurs in one of said second plurality of circuits and for selectively rendering said first and second latching means inoperative when trouble occurs in one of said first plurality of electrical circuits.

5. In a circuit controller, the combination of a first and second electrical circuit, a first pair of electrical contacts operable to close within said first electrical circuit, a second pair of electrical contacts operable to close within said second electrical circuit, mechanical means sequentially movable forwardly from a home position to a first and second position, said mechanical means operative in said first position to close said first contacts and operative in said second position to close said second contacts, return means adapted to urge said mechanical means backwardly for opening said contacts, first latching means operative to hold said mechanical means in the first position against the urging of said return means, second latching means operative to hold said mechanical means in the second position against the urging of said return means, means operable for detecting and locating electrical trouble in said first and second electrical circuits, and means operable under control of said trouble detecting and locating means for selectively rendering inoperative said second latching means to return said mechanical means to the first latching position and open said second pair of contacts, or said first and second latching means to return said mechanical means to said home position and open said first and second pairs of contacts, dependent upon the location of said electrical trouble.

6. In a circuit controller, the combination of a first and second electrical circuit, a first pair of electrical contacts operable to close within said first electrical circuit, a second pair of electrical contacts operable to close within said second electrical circuit, mechanical means sequentially movable forwardly from a home position to a first and second position, said mechanical means operative in said first position to close said first contacts and operative in said second position to close said second contacts, return means adapted to urge said mechanical means backwardly for opening said contacts, first latching means operative to hold said mechanical means in the first position against the urging of said return means, second latching means operative to hold said mechanical means in the second position against the urging of said return means, means operable for detecting electrical trouble in said first electrical circuit, means operable for detecting electrical trouble in said second electrical circuit, means operable under control of said second circuit trouble detecting means for selectively rendering inoperative said second latching means to return said mechanical means to the first latching position, and means operative under control of said first circuit trouble detecting means for selectively rendering inoperative said first and said second latching means to return said mechanical means to the home position.

7. In a circuit controller, the combination of a first plurality of electrical circuits, a second plurality of electrical circuits, a plurality of contacts operable to close within the electrical circuits of each said plurality, a shaft supported for incremental rotation from a home position, a plurality of cams fixed on said shaft, said cams being adapted to close sequentially the contacts of said first plurality of circuits and then the contacts of said second plurality of circuits as said shaft is rotated, solenoid means for rotating said shaft by successive increments, first latching means for latching said shaft after each increment for a first plurality of increments necessary to sequentially close said contacts of said first plurality of circuits, second latching means for latching said shaft after each increment for a succeeding second plurality of increments necessary to sequentially close said contacts of said second plurality of circuits, means rotationally urging said shaft toward said home position to open said contacts, first means for detecting electrical trouble in said second plurality of circuits, means responsive to the detection of said trouble by said first detecting means for rendering said second latching means ineffective so that said contacts of said second plurality of circuits are opened in reverse sequence, second means for detecting trouble in any of said first plurality of circuits, and means responsive to the detection of trouble by said second detecting means for rendering said first and second latching means ineffective so that said contacts of said first and second pluralities of circuits are opened in a reverse sequence and said shaft returns to said home position.

8. The device as described in claim 7 wherein said solenoid means includes clutch means intermittently engageable with said shaft, and a timing means for controlling the time between successive engagements of said clutch means with said shaft during said first plurality of increments.

References Cited in the file of this patent

UNITED STATES PATENTS

| | | |
|---|---|---|
| 1,558,448 | Anderson | Oct. 20, 1925 |
| 1,856,172 | Schimpf | May 3, 1932 |
| 2,354,158 | Taliaferro | July 18, 1944 |
| 2,383,327 | Ludwig | Aug. 21, 1945 |
| 2,398,007 | Hunter | Apr. 9, 1946 |
| 2,534,898 | Burkhart | Dec. 19, 1950 |
| 2,534,902 | Cuttino | Dec. 19, 1950 |
| 2,555,508 | Pudelko | June 5, 1951 |
| 2,637,822 | Kingsley | May 5, 1953 |
| 2,693,566 | Hooper | Nov. 2, 1954 |
| 2,762,952 | Bruderlin | Sept. 11, 1956 |
| 2,794,969 | Barnhart | June 4, 1957 |
| 2,820,860 | Kozikowski | Jan. 21, 1958 |
| 2,963,628 | Ostland | Dec. 6, 1960 |

UNITED STATES PATENT OFFICE
CERTIFICATE OF CORRECTION

Patent No. 3,054,932 September 18, 1962

Eugene V. Montross

It is hereby certified that error appears in the above numbered patent requiring correction and that the said Letters Patent should read as corrected below.

Column 1, lines 39 and 40, for "detectio nof" read -- detection of --; column 3, line 40, for "berakers" read -- breakers --; column 5, lines 40 and 41, for "clockwise" read -- counterclockwise --; line 45, for "opening" read -- closing --; column 6, line 51, for "to" read -- and --; same line 51, strike out "which"; column 8, line 16, for "132" read -- 130 --; column 11, line 44, for "intension" read -- intention --.

Signed and sealed this 22nd day of October 1963.

(SEAL)
Attest:

EDWIN L. REYNOLDS

ERNEST W. SWIDER
Attesting Officer

Acting Commissioner of Patents